United States Patent
Pan

(10) Patent No.: US 10,414,341 B2
(45) Date of Patent: Sep. 17, 2019

(54) AUTOMOBILE INTERIOR REARVIEW MIRROR

(71) Applicant: Global Media Industry Group Co., Ltd., Shenzhen (CN)

(72) Inventor: Lei Pan, Shenzhen (CN)

(73) Assignee: Global Media Industry Group Co., Ltd., Shenzhen (CN)

( * ) Notice: Subject to any disclaimer, the term of this patent is extended or adjusted under 35 U.S.C. 154(b) by 124 days.

(21) Appl. No.: 15/638,037

(22) Filed: Jun. 29, 2017

(65) Prior Publication Data

US 2019/0001892 A1  Jan. 3, 2019

(51) Int. Cl.
| | |
|---|---|
| *B60R 1/04* | (2006.01) |
| *B60R 1/08* | (2006.01) |
| *B60R 1/12* | (2006.01) |
| *G06F 3/041* | (2006.01) |
| *B60Q 3/258* | (2017.01) |
| *G06F 1/16* | (2006.01) |
| *B60Q 3/14* | (2017.01) |
| *G06F 3/044* | (2006.01) |

(52) U.S. Cl.
CPC ............... *B60R 1/04* (2013.01); *B60Q 3/14* (2017.02); *B60Q 3/258* (2017.02); *B60R 1/083* (2013.01); *B60R 1/088* (2013.01); *B60R 1/12* (2013.01); *G06F 1/1605* (2013.01); *G06F 3/0416* (2013.01); *B60R 2001/1215* (2013.01); *B60R 2001/1223* (2013.01); *G06F 3/044* (2013.01); *G06F 2203/0339* (2013.01)

(58) Field of Classification Search
CPC .. B60R 1/04; B60R 1/083; B60R 1/12; B60Q 3/258; B60Q 1/2665
USPC ........................................................ 345/174
See application file for complete search history.

(56) References Cited

U.S. PATENT DOCUMENTS

| | | | | |
|---|---|---|---|---|
| 5,572,354 A | * | 11/1996 | Desmond ................. | B60R 1/04 359/265 |
| 2005/0264891 A1 | * | 12/2005 | Uken ........................ | B60R 1/12 359/606 |
| 2012/0026571 A1 | * | 2/2012 | Uken ...................... | B60R 1/088 359/267 |
| 2012/0236388 A1 | * | 9/2012 | De Wind ................. | B60R 1/04 359/267 |
| 2013/0148063 A1 | * | 6/2013 | Maeda ..................... | B60R 1/12 349/114 |
| 2014/0022390 A1 | * | 1/2014 | Blank ...................... | B60R 1/12 348/148 |
| 2015/0239399 A1 | * | 8/2015 | Tonar ...................... | B60R 1/088 359/274 |
| 2017/0166134 A1 | * | 6/2017 | Gao ......................... | B60R 1/04 |

(Continued)

*Primary Examiner* — Fred Tzeng
(74) *Attorney, Agent, or Firm* — Schwegman Lundberg & Woessner, P.A.

(57) ABSTRACT

Provided is an automobile interior rearview mirror for solving the problem that the existing automobile interior rearview mirrors usually cannot simultaneously have the anti-glare function and the touch key operation function, including: a front frame, a corresponding PCB key strip provided below the front frame, and a glass mirror provided below the PCB key strip, wherein the PCB key strip is provided thereon with PCB touchpads, the PCB touchpads each are provided thereon with a metal sensor sheet, the metal sensor sheets are connected with a rearview mirror CPU by a bonding pad via a leading wire.

12 Claims, 3 Drawing Sheets

(56) References Cited

U.S. PATENT DOCUMENTS

2017/0177935 A1\* 6/2017 Weller ..................... B60R 1/04
2017/0267179 A1\* 9/2017 Herrmann ............ B60Q 1/2665

\* cited by examiner

AUTOMOBILE INTERIOR REARVIEW MIRROR

TECHNICAL FIELD

The present invention relates to the technical field of automobile parts, and particularly to an automobile interior rearview mirror.

BACKGROUND ART

Automobile rearview mirrors are located at both left and right sides of an automobile head portion and at a front position inside the automobile. The rearview mirrors at both left and right sides of the automobile head portion can reflect circumstances at the sides of and underneath the automobile; and the rearview mirror at the front position inside the automobile, i.e. automobile interior rearview mirror, can reflect the circumstances behind and inside the automobile. Among these, the automobile interior rearview mirrors can be classified into common rearview mirrors and anti-glare rearview mirrors; and the common rearview mirrors are generally plane mirrors, while the anti-glare rearview mirrors usually consist of a mirror with a glass comprising an electrically conductive layer, two photosensitive diodes, and an electronic controller.

At present, the automobile interior rearview mirrors from the market also can be classified into electronic function type and non-electronic function type; the automobile interior rearview mirrors of the electronic function type usually have keys for performing corresponding function conversion in order to ensure that various electronic functions can be realized. In the prior art, the above keys of the automobile interior rearview mirrors of the electronic function type may be touch keys; specifically, the touch key may include: a PCB board located below a rearview mirror glass, and a copper sheet provided at a corresponding area on the PCB board. In the use process, when a human hand touches the rearview mirror glass, a varying capacitive effect is formed between a finger and the copper sheet on the PCB board, so that the object of controlling the automobile interior rearview mirror of the electronic function type to execute a relevant command can be achieved.

However, the inventor of the present application found that since the glass of the anti-glare rearview mirror comprises the electrically conductive layer, the finger and the copper sheet on the PCB board will be insulated by this electrically conductive layer, thus it is impossible to form the varying capacitive effect, and further it is impossible to realize touch screen operations, that is, the automobile interior rearview mirrors in the prior art usually cannot simultaneously have the anti-glare function and the touch key operation function.

DISCLOSURE OF THE INVENTION

An object of the present invention is to provide an automobile interior rearview mirror so as to solve the problem that the automobile interior rearview mirrors in the prior art usually cannot simultaneously have the anti-glare function and the touch key operation function.

The present invention provides an automobile interior rearview mirror, including: a front frame, a corresponding PCB key strip provided below the front frame, and a glass mirror provided below the PCB key strip, wherein the PCB key strip is provided thereon with at least one PCB touchpad, and each of the at least one PCB touchpad is provided thereon with a metal sensor sheet; and the metal sensor sheet is connected with a rearview mirror CPU by a bonding pad via a leading wire.

In the above, the front frame is a plastic frame.

Specifically, the glass mirror is a plane mirror or an anti-glare mirror.

Further, a light strip is provided below the glass mirror, the light strip is provided with hidden characters; the light strip is provided at an inner side of the PCB key strip, and the hidden characters are provided to be corresponding to the PCB touchpad; when a human hand touches the front frame, the hidden characters are lightened; when the human hand does not touch the front frame for a long period of time, the lightened hidden characters disappear.

Preferably, the PCB key strip is provided with a plurality of the PCB touchpads, and each of the PCB touchpads is provided with the metal sensor sheet; the PCB touchpads are able to be used to be corresponding respectively to different instruction inputs.

In actual application, a rear housing is provided below the light strip, and the rear housing is in butt joint with the front frame.

In the above, the rear housing is provided with universal serial bus (USB) interfaces.

Specifically, a screen and a PCB board are provided between the light strip and the rear housing, and the screen is provided to be located above the PCB board. When a human hand touches the front frame, the screen can display the hidden characters in an on screen display (OSD) manner; when the human hand does not touch the front frame for a long period of time, the lightened hidden characters disappear.

Further, an upper supporting plate is provided above the PCB board, and the upper supporting plate is provided to be located below the screen; a lower supporting plate is provided below the PCB board, and the lower supporting plate is provided to be located above the rear housing.

Preferably, the rear housing is connected with a fixed support.

With respect to the prior art, the automobile interior rearview mirror in the present invention has the following advantages:

the automobile interior rearview mirror provided in the present invention includes: the front frame, wherein the corresponding PCB key strip can be provided below the front frame, the glass mirror can be provided below the PCB key strip; the above PCB key strip can be provided with the PCB touchpads, each of the PCB touchpads can be provided with the metal sensor sheet; the metal sensor sheets can be connected with the rearview mirror CPU by the bonding pad via the leading wire. Thus, it can be seen from analysis that for the automobile interior rearview mirror provided in the present invention, the PCB key strip having the PCB touchpads and the metal sensor sheets is provided between the front frame and the glass mirror, i.e. the PCB key strip is disposed above the glass mirror, and the metal sensor sheets are connected with the rearview mirror CPU by the bonding pad via the leading wire, thus a varying capacitive effect may be formed between a human hand and the metal sensor sheet on the PCB touchpad by touching the front frame, moreover, the rearview mirror CPU may sense variation of a capacitance value to convert it into a relevant key instruction and execute the same, further, the object of performing the touch key operation for the automobile interior rearview mirror having the anti-glare function can be realized.

BRIEF DESCRIPTION OF DRAWINGS

In order to more clearly illustrate technical solutions of Examples of the present invention or the related art, figures which are needed for description of the Examples or the related art will be introduced briefly below. Apparently, the figures in the description below merely show some examples of the present invention. A person ordinarily skilled in the art still can obtain other relevant figures according to these figures, without using inventive efforts.

| Reference signs: | |
|---|---|
| 1—front frame; | 2—PCB key strip; |
| 3—glass mirror; | 21—PCB touchpad; |
| 22—metal sensor sheet; | 23—bonding pad; |
| 4—light strip; | 41—hidden character; |
| 5—rear housing; | 51—USB interface; |
| 511—mouse USB interface; | 512—keyboard USB interface; |
| 6—screen; | 7—PCB board; |
| 81—upper supporting plate; | 82—lower supporting plate; |
| 9—fixed support. | |

DETAILED DESCRIPTION OF EMBODIMENTS

Below technical solutions of the present invention will be described clearly and completely in conjunction with the figures. Apparently, some but not all of examples of the present invention are described. Based on the examples of the present invention, all the other examples, which a person ordinarily skilled in the art obtains without using inventive effort, fall within the scope of protection of the present invention.

In the description of the present invention, it should be noted that orientational or positional relationships indicated by terms such as "center", "upper", "lower", "left", "right", "vertical", "horizontal", "inner", and "outer" are based on orientational or positional relationships as shown in the figures, merely for facilitating describing the present invention and simplifying the description, rather than indicating or suggesting that related devices or elements have to be in the specific orientation or configured and operated in specific orientation, therefore, they should not be construed as limiting the present invention. Besides, terms such as "first", "second", and "third" are merely for descriptive purpose, but should not be construed as indicating or implying importance in relativity.

In the description of the present invention, it should be indicated that unless otherwise specified and defined, terms "mount", "join", and "connect" should be understood in a broad sense, for example, the connection may be fixed connection, detachable connection, or integrated connection; it may be mechanical connection or electrical connection; and it may be direct connection or indirect connection through an intermediate medium; and also may be an inner communication between two elements. For a person ordinarily skilled in the art, specific meanings of the above-mentioned terms in the present invention can be understood according to specific circumstances.

Figure 1:
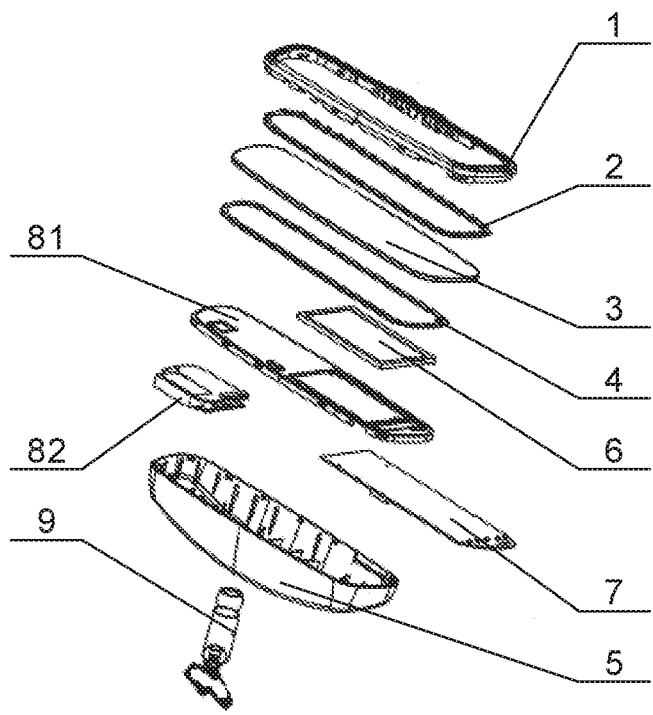
FIG. 1 is an exploded structural schematic view of an automobile interior rearview mirror provided in an example of the present invention.
Figure 2:
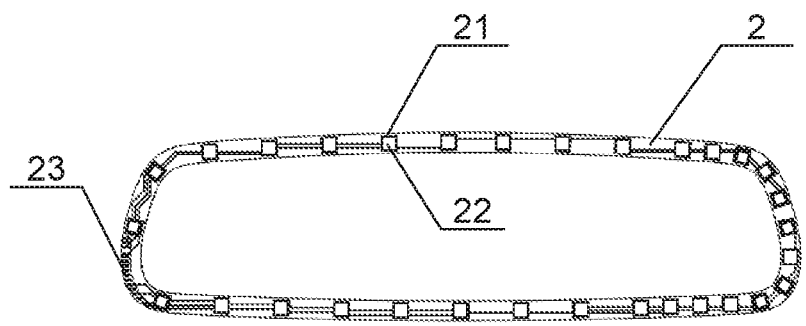
FIG. 2 is a structural schematic view of a PCB key strip in the automobile interior rearview mirror provided in the example of the present invention.

FIG. 1 is an exploded structural schematic view of an automobile interior rearview mirror provided in an example of the present invention; and FIG. 2 is a structural schematic view of a PCB key strip in the automobile interior rearview mirror provided in the example of the present invention.

As shown in FIG. 1 and FIG. 2, the example of the present invention provides an automobile interior rearview mirror, including: a front frame 1, a corresponding PCB key strip 2 provided below the front frame 1, a glass mirror 3 provided below the PCB key strip 2, wherein the PCB key strip 2 is provided thereon with at least one PCB touchpad 21, each of the at least one PCB touchpad 21 is provided thereon with a metal sensor sheet 22; and the metal sensor sheet 22 is connected with a rearview mirror CPU by a bonding pad 23 via a leading wire.

With respect to the prior art, the automobile interior rearview mirror in the example of the present invention has the following advantages:

the automobile interior rearview mirror provided in the example of the present invention, as shown in FIG. 1, includes: the front frame 1, wherein the corresponding PCB key strip 2 can be provided below the front frame 1, the glass mirror 3 can be provided below the PCB key strip 2; as shown in FIG. 2, the above PCB key strip 2 can be provided thereon with the PCB touchpads 21, each of the PCB touchpads 21 can be provided thereon with the metal sensor sheet 22; the metal sensor sheets 22 can be connected with the rearview mirror CPU (not shown in the figures) by the bonding pad 23 via the leading wire. Thus, it can be seen from analysis that for the automobile interior rearview mirror provided in the example of the present invention, the PCB key strip 2 having the PCB touchpads 21 and the metal sensor sheets 22 is provided between the front frame 1 and the glass mirror 3, i.e. the PCB key strip 2 is disposed above the glass mirror 3, and the metal sensor sheets 22 are connected with the rearview mirror CPU by the bonding pad 23 via the leading wire, thus a varying capacitive effect may be formed between a human hand and the metal sensor sheet 22 on the PCB touchpad 21 by touching the front frame 1, moreover, the rearview mirror CPU may sense variation of a capacitance value to convert it into a relevant key instruction and execute the same, further, the object of performing the touch key operation for the automobile interior rearview mirror having the anti-glare function can be realized.

It should be explained herein that PCB, Printed Circuit Board, also called as printed wiring board, is an important electronic part, a supporting body of electronic devices, and a carrier for electrical connection of electronic devices; CPU, Central Processing Unit, is a very large-scale integrated circuit, and operation core and control core of a computer, with the main functions of explaining computer instructions and processing data in computer software.

In the above, in order to facilitate formation of the varying capacitive effect at the metal sensor sheets 22 on the PCB key strip 2 abutting against the front frame 1 from below after the human hand touches the front frame 1, in the automobile interior rearview mirror provided in the example of the present invention, the above front frame 1 is preferably a plastic frame.

Specifically, as shown in FIG. 1, in the automobile interior rearview mirror provided in the example of the present invention, since the PCB key strip 2 is disposed above the glass mirror 3, the above glass mirror 3 may be a plane mirror, and also may be an anti-glare mirror, thus the automobile interior rearview mirror provided in the example of the present invention can achieve the object of performing the touch key operation for the automobile interior rearview mirror having the anti-glare function.

Figure 3:
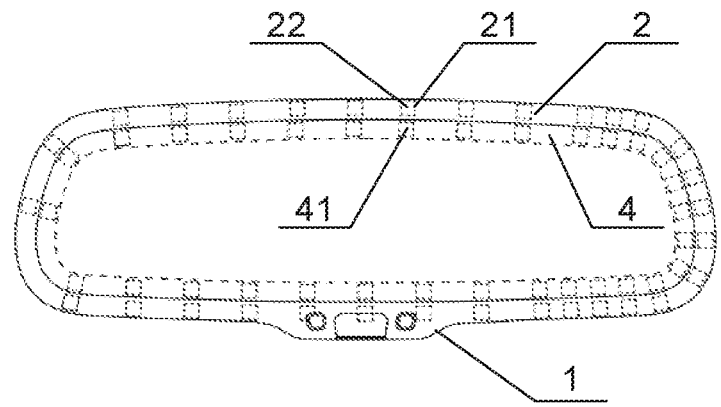
FIG. 3 is a structural schematic view of a light strip in the automobile interior rearview mirror provided in the example of the present invention.
Figure 4:
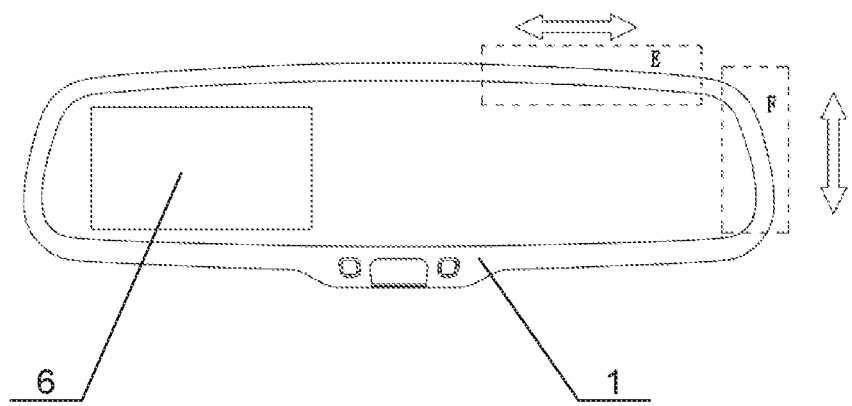
FIG. 4 is a schematic view showing a touch control manner of the automobile interior rearview mirror provided in example of the present invention.

FIG. 3 is a structural schematic view of the light strip in the automobile interior rearview mirror provided in the example of the present invention; and FIG. 4 is a schematic view showing a touch control manner of the automobile interior rearview mirror provided in the example of the present invention.

Further, in order to precisely touch the metal sensor sheets 22 below the front frame 1, as shown in FIG. 1, a light strip 4 may be provided below the above glass mirror 3; furthermore, as shown in FIG. 3, the light strip 4 may be provided thereon with hidden characters 41; moreover, the light strip 4 may be provided to be located at an inner side of the PCB key strip 2, and the hidden characters 41 may be provided to be corresponding to the PCB touchpads 21. In the use process, when the human hand touches the front frame 1, the hidden characters 41 are lightened, to display key functions of the PCB touchpads 21 corresponding to the hidden characters 41, facilitating the user in performing the touch control operation; when the human hand does not touch the front frame 1 for a long period of time, the lightened hidden characters 41 disappear to form a clean intact reflecting mirror; when the human hand slides on the front frame 1, the disappearance of the lightened hidden characters 41 is delayed, so that it is convenient for the user to continue to perform the touch control operation. When the human hand touches the front frame 1, the hidden characters also can be displayed on the screen in an OSD manner. For example, as shown in FIG. 4, when a finger slides left or right in a region E on the front frame 1, or slides up or down in a region F on the front frame 1, left or right, and up or down movement of a cursor just as achieved by a mouse can be realized, thus serving the function of delaying the disappearance of the lightened hidden characters 41, and ensuring the user to be able to continue with the touch control operation. Of course, the above examples are merely for better explanation, while other touched regions can be used in substitution in actual operations.

Figure 5:
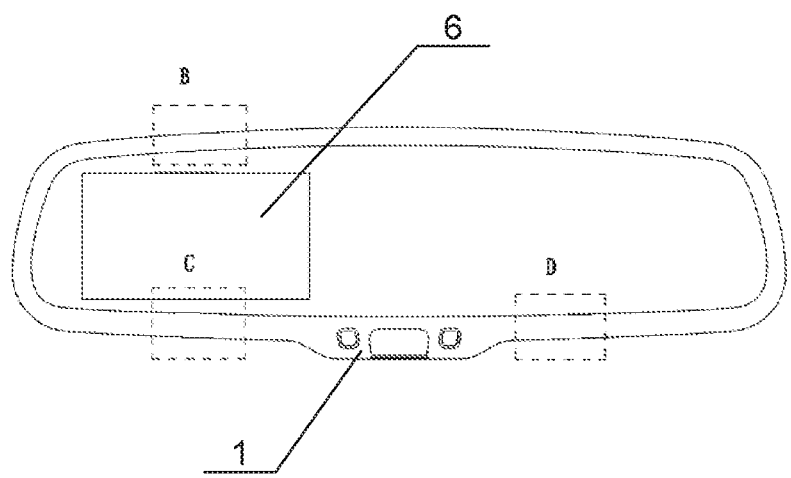
FIG. 5 is a schematic view showing another touch control manner of the automobile interior rearview mirror provided in the example of the present invention.

FIG. 5 is a schematic view showing another touch control manner of the automobile interior rearview mirror provided in the example of the present invention.

Preferably, in order to realize touch control of multiple different functions, as shown in FIG. 2 and FIG. 3, the above PCB key strip 2 may be provided thereon with a plurality of the PCB touchpads 21, and each PCB touchpad 21 may be provided thereon with a metal sensor sheet 22, such that the touch control to PCB touchpads 21 may be corresponding respectively to different instruction inputs, thus multiple different functions are realized. For example, as shown in FIG. 5, when a region B and a region D on the front frame 1 are touched in sequence, a function of opening a gate of user's house can be realized; when the region B and a region C on the front frame 1 are touched in sequence, a function of opening a garage door of the user's house can be realized; and when the region B, the region C, and the region D on the front frame 1 are touched in sequence, the function of relieving alarm of the user's house can be realized. Of course, the above examples are merely for better explanation, while the sequence and touched regions may be changed in actual operations.

In actual application, in order to encapsulate and fix the PCB key strip 2, the glass mirror 3, and the light strip 4, as shown in FIG. 1, a rear housing 5 can be provided below the above light strip 4, and the rear housing 5 can be in butt joint with the front frame 1, so as to realize good encapsulation and fixation of the PCB key strip 2, the glass mirror 3, and the light strip 4.

Figure 6:
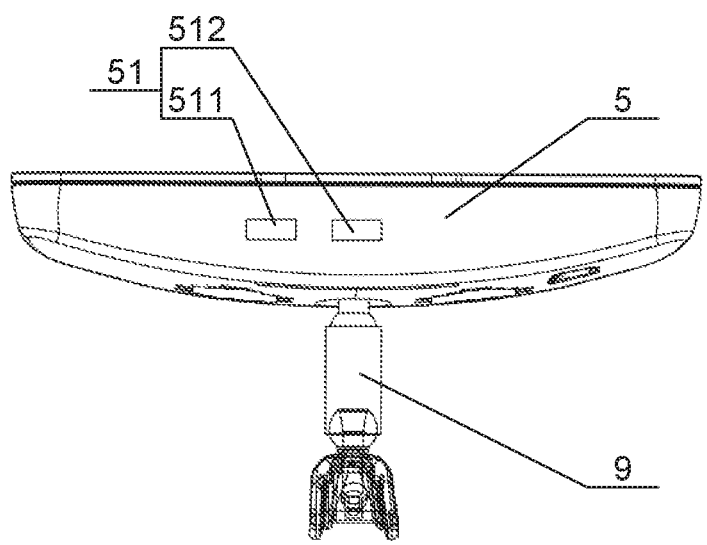
FIG. 6 is a top structural schematic view of the automobile interior rearview mirror provided in the example of the present invention.

FIG. 6 is a top structural schematic view of the automobile interior rearview mirror provided in the example of the present invention.

In the above, in order to further realize a man-machine interaction function, as shown in FIG. 6, the above rear housing 5 can be provided with USB interfaces 51. Specifically, the USB interfaces 51 can include a mouse USB interface 511 and a keyboard USB interface 512, so that a mouse can be externally connected via the mouse USB interface 511, and a keyboard can be externally connected via the keyboard USB interface 512, thus realizing the man-machine interaction function, and further effectively improving the use effect and multifunctionality of the automobile interior rearview mirror.

Specifically, in the automobile interior rearview mirror provided in the example of the present invention, as shown in FIG. 1, FIG. 4, and FIG. 5, a screen 6 and a PCB board 7 further can be provided between the above light strip 4 and the rear housing 5, and the screen 6 can be provided to be located above the PCB board 7, so that the display function of the automobile interior rearview mirror can be realized with the arrangement of the screen 6, and the electronic remote control function of the automobile interior rearview mirror can be ensured with the arrangement of the PCB board 7.

Further, in order to facilitate the fitting of the PCB board 7 and improve its stability, as shown in FIG. 1, an upper supporting plate 81 can be provided above the above PCB board 7, and the upper supporting plate 81 can be provided to be located below the screen 6; in order to further effectively improve the stability of the PCB board 7, a lower supporting plate 82 further can be provided below the above PCB board 7, and the lower supporting plate 82 can be provided to be located above the rear housing 5, thus the PCB board 7 is sandwiched between the upper supporting plate 81 and the lower supporting plate 82, so as to realize stable fitting of the PCB board 7.

Preferably, in order to make it easy to mount and fix the automobile interior rearview mirror in the automobile, as shown in FIG. 1, the above rear housing 5 can be connected with a fixed support 9, so as to mount and fix the automobile interior rearview mirror on a front windshield of the automobile via the fixed support 9; moreover, in order to ensure that a person in the automobile can perform angle adjustment on the automobile interior rearview mirror, the above fixed support 9 may be in hinged fixation with the automobile interior rearview mirror.

The automobile interior rearview mirrors in the prior art, usually using physical keys (for example, mouse, keyboard), are inconvenient to carry along and operate, affecting the use experience; if mechanical keys are added, the area of the rearview mirror will be increased, which affects the aesthetics; besides, for a rearview mirror integrated with a remote control function, once the automobile is stolen, the thief can directly press the keys on the rearview mirror to open the gate, the garage door, etc. of the owner of the automobile, so that the security is relatively poor, and the home safety will easily be threatened.

The automobile interior rearview mirror provided in the examples of the present invention not only can realize the object of performing the touch key operation for the automobile interior rearview mirror having the anti-glare function, but also can hide the keys when the key functions are not needed, ensuring that the private key functions are not divulged, for example, the keys for the functions of remote control of the gate, the garage door, and the security alarm system etc. are hidden, so as to greatly improve the home safety, meanwhile, the aesthetics further can be improved; besides, the man-machine interaction function further can be realized by externally connecting the mouse and the keyboard; and the automobile interior rearview mirror provided in the examples of the present invention has a low cost and is convenient to manufacture.

Finally, it is to be explained that the above-mentioned examples are merely used to illustrate the technical solutions of the present invention, rather than limiting the invention. While the detailed description is made to the present invention with reference to the above-mentioned examples, those ordinarily skilled in the art should understand that the technical solutions recited in the above-mentioned examples still can be modified, or equivalent substitutions can be made to some or all of the technical features; and these modifications or substitutions do not make the corresponding technical solutions essentially depart from the spirit and scope of the technical solutions of the examples of the present invention.

The invention claimed is:

1. An automobile interior rearview mirror, comprising:
a front frame, a corresponding printed circuit board (PCB) key strip provided below the front frame, and a glass mirror provided below the PCB key strip;
wherein the PCB key strip is provided thereon with at least one PCB touchpad, and
each of the at least one PCB touchpad is provided thereon with a metal sensor sheet;
the metal sensor sheet is connected with a rearview mirror central processing unit (CPU) by a bonding pad via a leading wire;
a light strip is provided below the glass mirror, the light strip is provided thereon with hidden characters, the light strip is provided to be located at an inner side of the PCB key strip, and the hidden characters are provided to be corresponding to the PCB touchpad;
the hidden characters are configured to be lightened when a human hand touches the front frame; and the lightened hidden characters are configured to disappear when the human hand does not touch the front frame for a long period of time; and
a rear housing is provided below the light strip, a screen and a PCB board are provided between the light strip and the rear housing, an upper supporting plate is provided above the PCB board, and the upper supporting plate is provided to be located below the screen, and a lower supporting plate is provided below the PCB board, and the lower supporting plate is provided to be located above the rear housing.

2. The automobile interior rearview mirror according to claim 1, wherein the front frame is a plastic frame.

3. The automobile interior rearview mirror according to claim 2, wherein the PCB key strip is provided thereon with a plurality of the PCB touchpads, and each of the PCB touchpads is provided thereon with the metal sensor sheet; and
the PCB touchpads are configured to be able to be used to be corresponding respectively to different instruction inputs.

4. The automobile interior rearview mirror according to claim 1, wherein the glass mirror is a plane mirror or an anti-glare mirror.

5. The automobile interior rearview mirror according to claim 4, wherein the PCB key strip is provided thereon with a plurality of the PCB touchpads, and each of the PCB touchpads is provided thereon with the metal sensor sheet; and
the PCB touchpads are configured to be able to be used to be corresponding respectively to different instruction inputs.

6. The automobile interior rearview mirror according to claim 1, wherein the PCB key strip is provided thereon with a plurality of the PCB touchpads, and each of the PCB touchpads is provided thereon with the metal sensor sheet; and
the PCB touchpads are configured to be able to be used to be corresponding respectively to different instruction inputs.

7. The automobile interior rearview mirror according to claim 1, wherein the rear housing is in butt joint with the front frame.

8. The automobile interior rearview mirror according to claim 7, wherein the rear housing is provided with universal serial bus (USB) interfaces.

9. The automobile interior rearview mirror according to claim 8, wherein the rear housing is connected with a fixed support.

10. The automobile interior rearview mirror according to claim 7, wherein the screen is provided to be located above the PCB board, and
the screen is configured to be able to display the hidden characters in an on screen display (OSD) manner when a human hand touches the front frame, and the lightened hidden characters are configured to disappear when the human hand does not touch the front frame for a long period of time.

11. The automobile interior rearview mirror according to claim 10, wherein the rear housing is connected with a fixed support.

12. The automobile interior rearview mirror according to claim 7, wherein the rear housing is connected with a fixed support.

* * * * *